(12) United States Patent
Colavin et al.

(10) Patent No.: US 7,836,279 B2
(45) Date of Patent: Nov. 16, 2010

(54) METHOD AND SYSTEM FOR SUPPORTING SOFTWARE PIPELINING USING A SHIFTING REGISTER QUEUE

(75) Inventors: Osvaldo Colavin, San Diego, CA (US);
Vineet Soni, San Diego, CA (US);
Davide Rizzo, San Diego, CA (US)

(73) Assignee: STMicroelectronics, Inc., Carrollton, TX (US)

( * ) Notice: Subject to any disclaimer, the term of this patent is extended or adjusted under 35 U.S.C. 154(b) by 1464 days.

(21) Appl. No.: 10/749,472

(22) Filed: Dec. 31, 2003

(65) Prior Publication Data
US 2005/0055542 A1 Mar. 10, 2005

Related U.S. Application Data

(60) Provisional application No. 60/500,838, filed on Sep. 5, 2003.

(51) Int. Cl.
*G06F 9/00* (2006.01)
(52) U.S. Cl. .................. 712/216; 712/219
(58) Field of Classification Search .......... 712/219, 712/216
See application file for complete search history.

(56) References Cited

U.S. PATENT DOCUMENTS 5,590,350 A * 12/1996 Guttag et al. .......... 712/36
5,872,989 A * 2/1999 Tsushima et al. ......... 712/23

FOREIGN PATENT DOCUMENTS

WO    WO 99/61997 A1    12/1999
WO    WO 02/17071 A1    2/2002

OTHER PUBLICATIONS

Rau et al.; "Register Allocation for Software Pipelined Loops"; 1992; ACM.*
Smelyanskiy et al.; "Register Queues: A New Hardware/Software Approach to Efficient Software Pipelining"; 2000; IEEE.*
E. Ercanli et al., "A Register File and Scheduling Model for Application Specific Processor Synthesis," 33rd Design Automation Conference, Jun. 3, 1996, pp. 35-40.
European Search Report dated Sep. 20, 2007 in connection with Application No. EP 04 25 7905.

* cited by examiner

*Primary Examiner*—Niketa I Patel
*Assistant Examiner*—Benjamin P Geib
(74) *Attorney, Agent, or Firm*—Lisa K. Jorgenson; William A. Munck

(57) ABSTRACT

A system for supporting software pipelining using a shifting register queue is provided. The system includes a register file that comprises a plurality of registers. The register file is operable to receive a shift mask signal and a shift signal and to identify a shifting register queue within the register file based on the shift mask signal. The shifting register queue comprises a plurality of queue registers. The register file is further operable to shift the contents of the queue registers based on the shift signal.

20 Claims, 3 Drawing Sheets

METHOD AND SYSTEM FOR SUPPORTING SOFTWARE PIPELINING USING A SHIFTING REGISTER QUEUE

PRIORITY CLAIM TO PROVISIONAL PATENT APPLICATION

This patent application claims priority to U.S. Provisional Patent Application Ser. No. 60/500,838 filed on Sep. 5, 2003.

TECHNICAL FIELD OF THE INVENTION

The present invention is directed in general to software pipelining and, more specifically, to a method and system for supporting software pipelining using a shifting register queue.

BACKGROUND OF THE INVENTION

Software pipelining is a compiler technique that transforms a loop described in a high-level programming language, such as C or FORTRAN, in such a way that the execution of successive iterations of the loop are overlapped rather than sequential. This technique exposes to the compiler and to the processor executing the transformed code the instruction level parallelism (ILP) available between successive loop iterations.

One of the side effects of this transformation is that the successive lifetimes of some loop variables are now overlapping in time. Such variables that were modeled as scalar values before the transformation (virtual registers) now typically need to be modeled as vectors of scalar values (Expanded Virtual Registers or EVR). Successive values stored in an EVR represent successive values in time of the original virtual register.

One compiler technique used to remedy this side effect is called Modulo Variable Expansion (MVE). It unrolls the code of the transformed loop a number of times equal to the number of overlapped lifetimes for the variable that maximizes this value. This, however, typically increases code size significantly.

Proper architectural support may obviate the need for MVE and code expansion. One approach is called a Rotating Register File (RRF). In an RRF, a configurable and contiguous set of registers is defined as the rotating section of the RRF and holds the EVRs. The other registers are unaffected and typically hold the variables that are not modified during the loop. Control registers (outside of the register file) define the position of, size of, and a current base inside the rotating section of the register file.

As an example, assume in the following that the rotating section starts at address 0 of the register file. When a register in the rotating section is accessed, its address, decoded from the instruction, is added to a base address, modulo the rotating section length. The base address is decremented by one each time an iteration terminates, as indicated by the execution of a specific branch instruction. The net effect of this renaming scheme is that a value defined at address A in iteration n appears at address A+1 in iteration n+1. The successive temporal values of a variable appear to shift through the successive registers allocated to its EVR. When the base is decremented, the register file is said to rotate.

The RRF suffers from implementation complexity, however, which may explain why it is rarely present in commercial products, and not at all in the embedded space, where cost and power dissipation are prime issues. The main contributor to this complexity is the register renaming logic, instantiated as many times as there are ports in the register file. This logic includes an addition (summing the decoded register address to the base address) producing an address+base value, followed by a subtraction (removing the rotating section length from the resulting address+base) producing and address+base−length value, followed by a selection (selecting between address+base and address+base−length, depending on the sign of the subtraction) resulting in the final renamed address. Together, the subtraction and selection implement a modulo operation. Another selection is required between the decoded address and the renamed address, depending on whether the decoded address accesses the rotating section or not. This logic also impacts the register address decoding critical path. This complexity may also explain why the rotating register section length is often limited to multiples of eight, leading to a waste of up to seven registers.

SUMMARY OF THE INVENTION

In accordance with the present invention, a method and system for supporting software pipelining using a shifting register queue are provided that substantially eliminate or reduce disadvantages and problems associated with conventional systems and methods.

Technical advantages of one or more embodiments of the present invention include providing an improved method for supporting software pipelining by implementing a system that obviates the use of MVE in software pipelining. In a particular embodiment, a new register file architecture that emulates the behavior of a rotating register file without the need for extra logic in the address decoding path is implemented. This is achieved by providing means inside the register file for values to be copied between successive registers, as defined by a control register. Address renaming is thus replaced by value movement between registers. When a shift occurs, indicated by a shift signal to the register file, a value in the register at address A will be copied into the register at address A+1, if so indicated in the control register.

From an implementation point of view, complexity is moved from the address decoding path to the register file. A shifting register file uses an internal write port to implement the shifting. In addition, the memory point of the register file may act as a master/slave register during shifting. This may impact only marginally register files with a large number of ports. This added complexity, however, may be unrelated to the size of the shifting section of the register file. Therefore, the shifting section can be dimensioned to exactly the size required by the register allocator, reducing or eliminating the waste of register resources.

Additionally, shifting register files have unique features. First, although the individual elements of an EVR may be allocated to consecutive registers, distinct EVRs need not be allocated contiguously. This gives more options to the register allocation phase of a compiler. However, allocating distinct EVRs contiguously sometimes results in the opportunity for sharing one physical register between consecutive EVRs. Second, the support for more than one shift queue in the register file is straightforward. Distinct shift queues would shift on different events, signaled by more than one shift signals provided to the register file. This feature allows the definition of queues inside the register file, where a queue would shift each time a new value is written at its head, for example. Unlike the typical definition of a queue, where values can be read only in the order in which they have been written, queues defined inside a shifting register file can be read and written by regular instructions at any of their locations.

As a result, communications between clustered register files are improved or optimized and streaming ports may be interfaced with the queues. In particular, the use of queues during software pipelining in a clustered VLIW may reduce or eliminate the need for specific copy instructions between clusters. In addition, as described above, the waste of register resources may be avoided and the system may be compatible with an RRF as far as register allocation is concerned, so that existing register allocation heuristics in compilers need not be changed.

Other technical advantages will be readily apparent to one skilled in the art from the following figures, description, and claims.

Before undertaking the DETAILED DESCRIPTION OF THE INVENTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, wherein like reference numerals represent like parts, in which.

DETAILED DESCRIPTION OF THE INVENTION

FIGS. 1 through 5, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged system.

Figure 1:
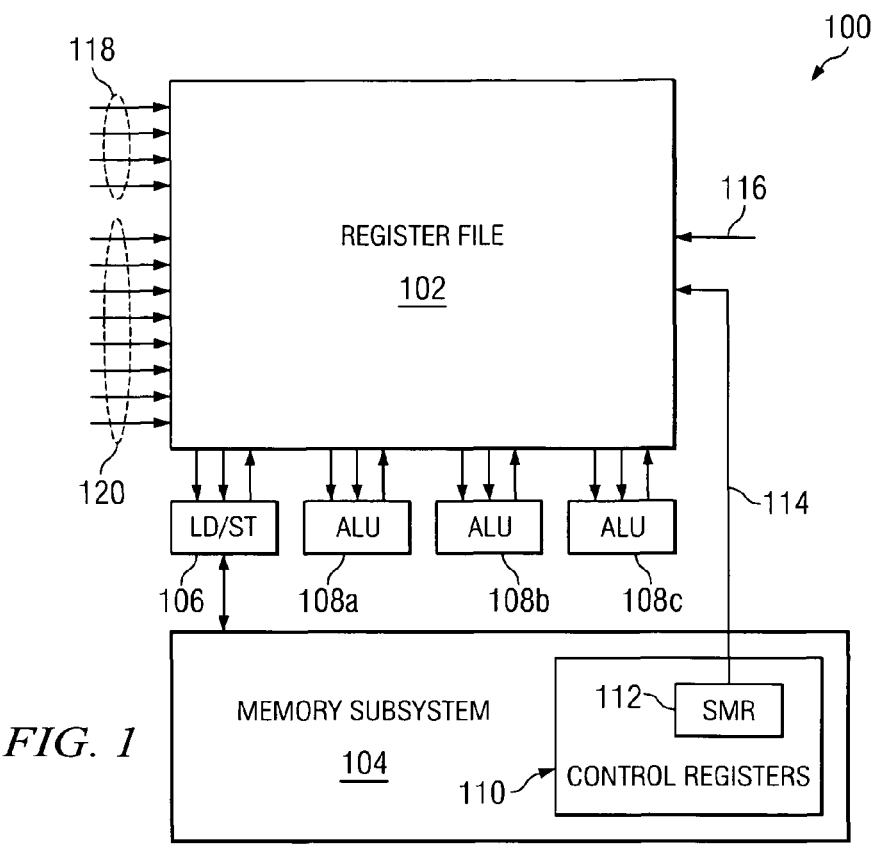
FIG. 1 is a block diagram illustrating a system for supporting software pipelining using a shifting register queue in accordance with one embodiment of the present invention.

FIG. 1 is a block diagram illustrating a system 100 for supporting software pipelining using a shifting register file in accordance with one embodiment of the present invention. The system 100 comprises a register file 102, a memory subsystem 104, a load/store unit 106 and a plurality of arithmetic logic units (ALUs) 108. It will be understood that the system 100 may comprise additional components without departing from the scope of the present invention.

As described in more detail below, the register file 102 comprises a plurality of registers, some or all of which may be used as a shifting register queue to implement expanded virtual register (EVR) renaming to support software pipelining. In all other respects, the register file 102 may operate as a state-of-the-art register file. The memory subsystem 104 comprises control registers 110, including a shift mask register 112 that is operable to define a shifting region, or shifting register queue, within the register file 102.

In operation, the shift mask register 112 provides a shift mask signal 114 to the register file 102. The register file 102 also receives a shift signal 116 from an external component (not illustrated in FIG. 1), such as a branch unit or instruction decoding logic. As used herein, "external" means external with respect to the system 100. Thus, the external component may be implemented together with the system 100 on an integrated circuit or in any other suitable manner.

The shift signal 116 is asserted to initiate a shift in the shifting region of the register file 102 and is de-asserted when no shift is needed. Thus, when the shift signal 116 is asserted, the register file 102 shifts the shifting region of the register file 102 as defined by the shift mask signal 114 from the shift mask register 112. During a shift, a register that is part of the shifting region, as defined by the shift mask register 112, reads in the value of the register preceding it.

The register file 102 may also receive write addresses 118 at four write ports and read addresses 120 at eight read ports from external components (not illustrated in FIG. 1) when data is to be written to or read from the register file 102. It will be understood, however, that the register file 102 may comprise any suitable number of read and write ports without departing from the scope of the present invention. In addition, it will be understood that shifting, writing to and/or reading from the register file 102 may occur simultaneously.

In a different embodiment of the register file 102, two or more shifting regions may be defined. For this embodiment, each shifting region is defined by a separate shift mask register 112 and is shifted when a dedicated shift signal 116 is asserted. Thus, the shift mask register 112 in this embodiment comprises a plurality of shift mask registers 112, the shift mask signal 114 comprises a plurality of shift mask signals 114, and the shift signal 116 comprises a plurality of shift signals 116.

Figure 2:
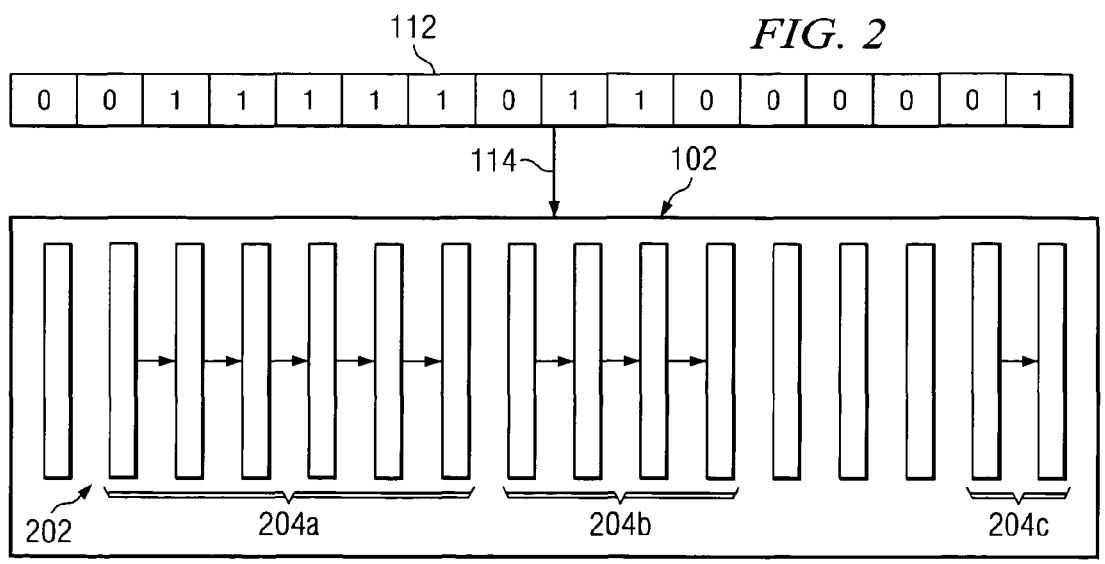
FIG. 2 is a block diagram illustrating the register file and the shift mask register of FIG. 1 in accordance with one embodiment of the present invention.

FIG. 2 is a block diagram illustrating how the shift mask register 112 defines shifting regions, or shifting register queues, within the register file 102 in accordance with one embodiment of the present invention. As described above in connection with FIG. 1, the register file 102 comprises a plurality of registers 202. Although the illustrated embodiment of the register file 102 comprises 16 registers 202, it will be understood that the register file 102 may comprise any suitable number of registers 202 without departing from the scope of the present invention.

The shifting region of the register file 102, which forms the shifting register queue 204, comprises at least a portion of those registers 202. Thus, for the illustrated embodiment, the shifting register queue 204 comprises a first set 204a of registers, a second set 204b of registers, and a third set 204c of registers. It will be understood, however, that this is for illustration only and that the shifting register queue 204 may comprise any combination of registers 202 without departing from the scope of the present invention. Furthermore, as illustrated in FIG. 2, the shifting register queue 204 of the register file 102 need not be contiguous. The ability to define a non-contiguous shifting register queue 204 may be taken advantage of by the register allocator phase in a compiler to simplify or optimize register allocation.

According to one embodiment, the shift mask register 112 comprises a plurality of bits, each of which is associated with a corresponding register 202 in the register file 102. As used herein, "each" means every one of at least a subset of the identified items. Thus, for this embodiment, the shift mask register 112 comprises the same number of bits as the number of registers 202 in the register file 102.

For the illustrated embodiment, if a bit in the shift mask register 112 is 0, the corresponding register 202 is not part of the shifting register queue 204, or a "non-queue" register 202. Alternatively, if the bit in the shift mask register 112 is 1, the corresponding register 202 is part of the shifting register queue 204, or a "queue" register. It will be understood that the shifting register queue 204 may be otherwise identified without departing from the scope of the present invention. For example, a bit of 0 may indicate a queue register 202 that is in the shifting register queue 204 and a bit of 1 may indicate a non-queue register 202 that is not in the shifting register queue 204.

The shift mask register 112 is operable to provide the information, i.e., the bits stored in the shift mask register 112, that identifies the shifting region of the register file 102 through the shift mask signal 114. The register file 102 is operable to receive the shift mask signal 114 and, based on that signal 114, to identify the corresponding registers 202 as either part of the shifting register queue 204 or not.

Figure 3:
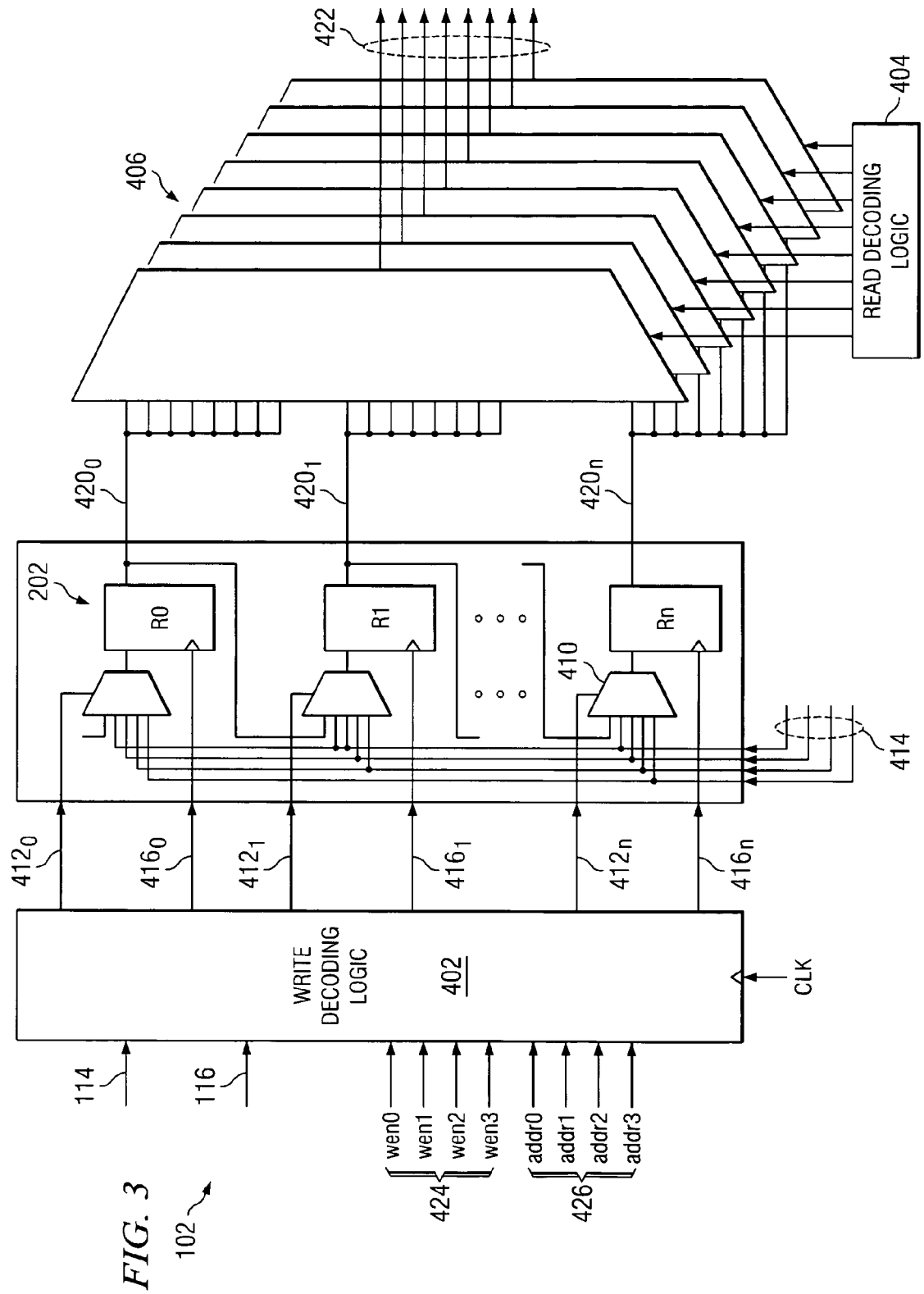
FIG. 3 is a block diagram illustrating the register file of FIG. 1 in accordance with one embodiment of the present invention.

FIG. 3 is a block diagram illustrating the register file 102 for supporting software pipelining in accordance with one embodiment of the present invention. The register file 102 comprises write decoding logic 402, read decoding logic 404, and a plurality of multiplexers 406. The write decoding logic 402 is operable to generate control signals and write signals for the register file 102. The read decoding logic 404 is operable to generate control signals for the multiplexers 406. Each multiplexer 406 corresponds to a read port and is operable to provide data based on a read request for the corresponding read port.

The register file 102 comprises a plurality of registers 202 and a plurality of multiplexers 410. For the illustrated embodiment, the registers 202 are implemented as edge-triggered flip-flops. In addition, it will be understood that each illustrated register 202 represents a plurality of registers 202. Thus, for example, the register 202 identified as $R_0$ may represent 32, 64 or any other suitable number of flip-flops that make up the register $R_0$. Each of the other registers 202 ($R_1$-$R_n$) represents the same number of flip-flops as the register $R_0$.

Each multiplexer 410 is associated with a corresponding register 202. The multiplexers 410 are operable to receive a control signal 412 from the write decoding logic 402 and to provide write data from write data lines 414 based on the control signal 412 to the corresponding register 202. The registers 202 are operable to receive a write signal 416 from the write decoding logic 402 and to allow a shift or write to be performed when the corresponding write signal 416 is asserted.

Each register 202 is operable to generate an output signal 420 based on the write data from the corresponding multiplexer 410 and the write signal 416 from the write decoding logic 402. As described in more detail below, the output signal 420 comprises either the write data for a shift operation or read data for a read operation. The output signal 420 comprises the number of bits corresponding to the number of flip-flops in each of the registers 202.

For a shift operation, the write decoding logic 402 receives the shift mask signal 114 from the shift mask register 112 and the shift signal 116 from an external component. The write decoding logic 402 provides the shift signal 116 as a write signal 416 to each of the registers 202 in the shifting register queue 204, as identified by the shift mask signal 114.

The output signal 420 from a particular register 202, $R_x$, is shifted to the next register 202, $R_{x+1}$, when that register 202, $R_{x+1}$, is part of the shifting register queue 204. In this situation, the write port for the register 202, $R_{x+1}$, that is receiving the output signal 420 from the previous register 202, $R_x$, is selected by the multiplexer 410 based on the control signal 412 provided by the write decoding logic 402.

For a read operation, the output signal 420 from the register 202 that is selected by the control signal 412 is provided to the multiplexers 406 for output to a requesting component. The read decoding logic 404 selects which signal in each multiplexer 406 to output as read data 422.

For a write operation, the write decoding logic 402 receives a write enable signal 424 that identifies a particular port for a specified register 202 into which the write data 414 corresponding to the particular port is to be written. The write decoding logic 402 also receives a comparison address 426 with which to compare an address for the specified register 202. Based on the write enable signal 424 and the verification of the comparison address 426, the write decoding logic 402 generates the control signal 412 that identifies the particular port for the specified register 202 and the write signal 416 that allows the write data 414 for that particular port to be written into the specified register 202.

Figure 4:
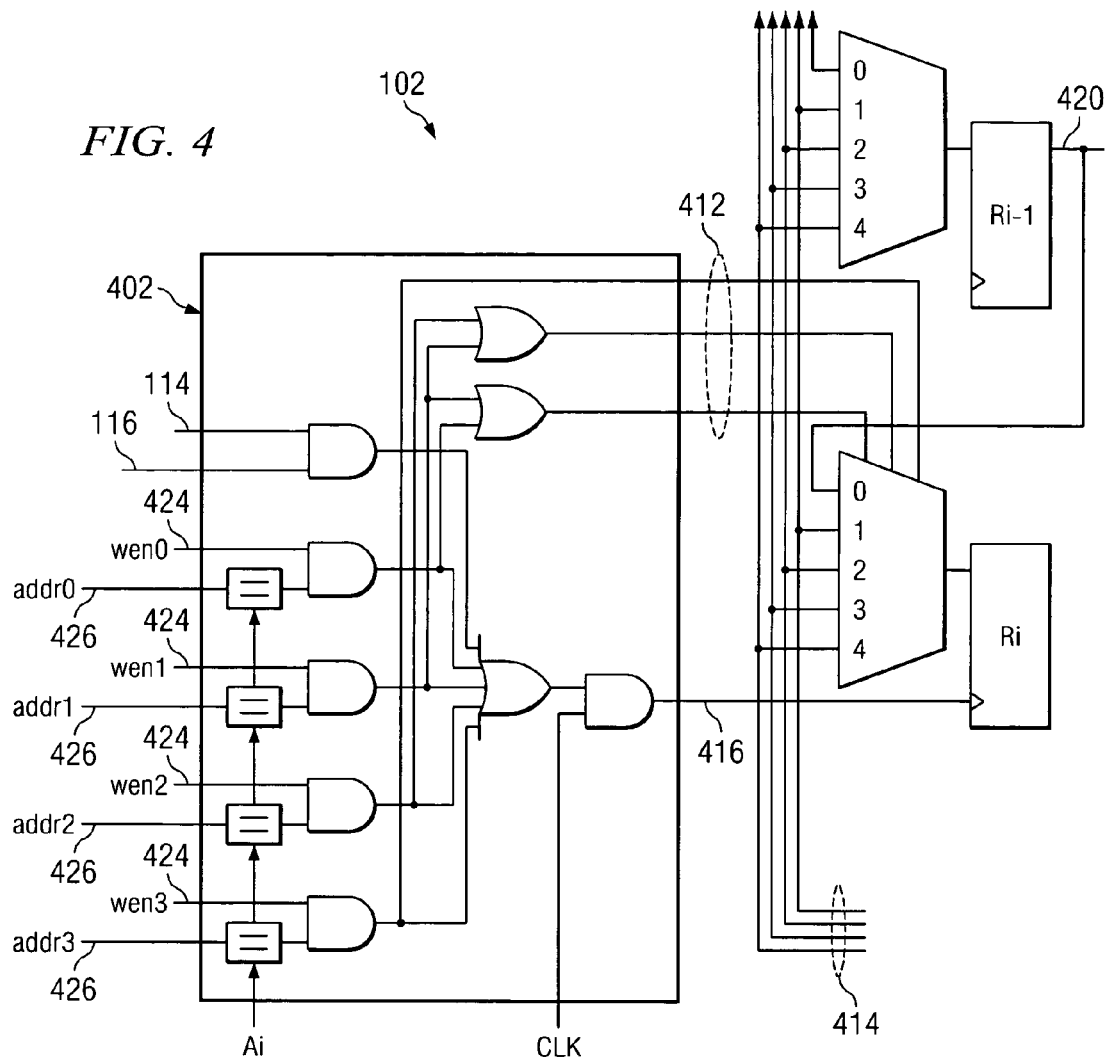
FIG. 4 is a block diagram illustrating details of the write decoding logic of FIG. 3 in accordance with one embodiment of the present invention.

It will be understood that read, write and/or shift operations may occur simultaneously on all ports. When a read to a register 202 in the shifting register queue 204 occurs simultaneously to a shift, the value read is that of the register 202 at the beginning of the operation, before the shifting. When a write to a register 202 in the shifting register queue 204 occurs simultaneously to a shift, the write operation takes precedence over the shift operation, as illustrated in FIG. 4. This feature allows the register allocator of a compiler to reuse any register 202 inside the shifting register queue 204 when the value contained in that register 202 is not needed anymore. In addition, it will be understood that, for the embodiment in which the register file 102 comprises two or more shifting regions, the write decoding logic 402 is also operable to decode the plurality of shift mask signals 114 and shift signals 116.

FIG. 4 is a block diagram illustrating details of the write decoding logic 402 in accordance with one embodiment of the present invention. For this embodiment, the write decoding logic 402 comprises a plurality of AND gates and OR gates. The comparison addresses 426 may be compared with the register addresses, $A_i$, as described above in connection with FIG. 3. The signals 412 and 416 may be generated based on the results of the write decoding logic 402, as illustrated.

For one embodiment, when the 3-bit value representing the control signal 412 is 0, the multiplexer 410 selects the data coming from the previous register 202, $R_{i-1}$, written to register 202, $R_i$, during a shift operation. When this value is 1, 2, 3 or 4, the multiplexer 410 selects the data on the corresponding write port. As described above, in the case where both a shift operation and a write operation from one of the write ports are asserted simultaneously, the decoding logic 402 will enforce the write operation.

It will be understood that other embodiments may be implemented in which the values of the control signal 412 that correspond to the write port for shifting and to the write ports for writing comprise other values. For example, the write port for shifting may correspond to a control signal 412 value of 3, while the control signal 412 values of 0, 1, 2 and 4 correspond to the write ports for writing.

Figure 5:
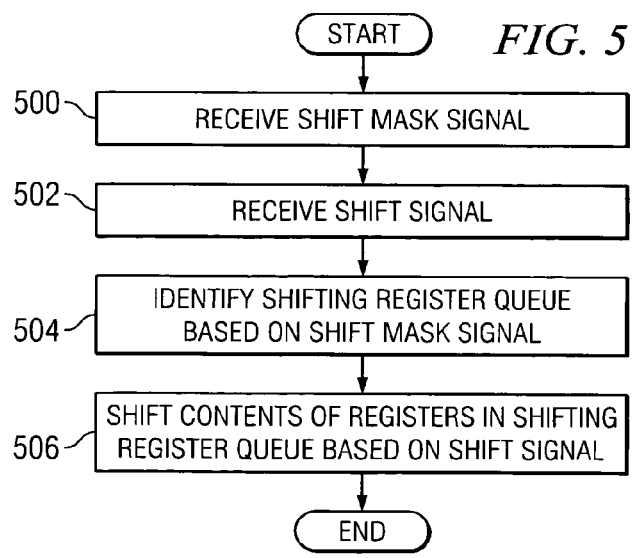
FIG. 5 is a flow diagram illustrating a method for supporting software pipelining using the shifting register queue of FIG. 2 in accordance with one embodiment of the present invention.

FIG. 5 is a flow diagram illustrating a method for supporting software pipelining using the shifting register queue 102 in accordance with one embodiment of the present invention. The method begins at step 500 where the register file 102 receives a shift mask signal 114 from the shift mask register 112. At step 502, the register file 102 receives a shift signal 116 from an external component. It will be understood that steps 500 and 502 may occur simultaneously.

At step 504, the register file 102 identifies the shifting register queue 204 within the register file 102 based on the shift mask signal 114. At step 506, based on the shift signal 116, the register file 102 shifts the contents of the registers 202 that make up the shifting register queue 204 such that each register 202 in the shifting register queue 204 receives the contents of the previous register 202 in the shifting register queue 204. In this way, a shifting register queue 204 that need not be contiguous may be implemented within the register file 102.

Although the present invention has been described with several embodiments, various changes and modifications may be suggested to one skilled in the art. It is intended that the present invention encompass such changes and modifications as fall within the scope of the appended claims.

What is claimed is:

1. A method for supporting software pipelining, comprising:
   receiving a shift mask signal from a shift mask register having information on a shifting region of a register file, wherein the shifting region comprises a plurality of non-contiguous registers;
   receiving a shift signal from an external component to trigger a shift;
   identifying a shifting register queue based on the shift mask signal, wherein the shifting register queue comprises a plurality of queue registers; and
   shifting the contents of the queue registers based on the shift signal such that each register in the shifting register queue receives the contents of the previous register in the shifting register queue.

2. The method of claim 1, wherein the shift mask signal is received from a shift mask register associated with the shifting register queue.

3. The method of claim 1, wherein the shift signal is received from an external component.

4. The method of claim 1, wherein the register file comprises the plurality of queue registers and a plurality of non-queue registers, and wherein the shift mask signal comprises a plurality of bits, each bit associated with a corresponding register in the register file.

5. The method of claim 4, wherein the bits in the shift mask signal that comprise is correspond to the queue registers, and wherein the bits in the shift mask signal that comprise 0s correspond to the non-queue registers.

6. The method of claim 4, wherein the bits in the shift mask signal that comprise 0s correspond to the queue registers, and wherein the bits in the shift mask signal that comprise is correspond to the non-queue registers.

7. A system for supporting pipelining comprising:
   a register file embodied in a computer readable medium comprising:
   a plurality of queue registers forming a shifting register queue based on a shift mask signal having information on a non-contiguous shifting region of the register file; and
   at least one non-queue register located between two queue registers.

8. The system of claim 7, further comprising a shift mask register operable to identify the queue registers within the register file.

9. The system of claim 8, wherein the shift mask register is further operable to provide the shift mask signal to the register file to identify the queue registers for the register file.

10. The system of claim 7, wherein the register file further comprises:
    write decoding logic operable to generate control signals and write signals; and
    a plurality of multiplexers, wherein each multiplexer corresponds to a register within the register file and is operable to receive one of the control signals from the write decoding logic and is further operable to provide write data to the corresponding register based on the control signal.

11. The system of claim 10, wherein the registers within the register file comprises edge-triggered flip-flops and are operable to receive the write data from the multiplexer and to receive one of the write signals from the write decoding logic.

12. The system of claim 11, wherein for each register other than a first register, the write data provided by each multiplexer to the corresponding register based on the control signal comprises data from a previous register in the register file.

13. A system for supporting pipelining comprising:
    a register file embodied in a computer readable medium configured to receive a shift mask signal and a shift signal, to identify a shifting register queue having a plurality of non-contiguous queue registers within the register file based on the shift mask signal, and to shift the contents of the queue registers based on the shift signal.

14. The system of claim 13, further comprising a shift mask register operable to identify the queue registers within the register file.

15. The system of claim 14, wherein the shift mask register is further operable to provide the shift mask signal to the register file.

16. The system of claim 13, wherein the shift mask signal comprises a plurality of bits, wherein each bit is associated with a corresponding register in the register file.

17. The system of claim 13, wherein the register file further comprises:
    write decoding logic operable to generate control signals and write signals; and
    a plurality of multiplexers, wherein each multiplexer corresponds to a register within the register file and is operable to receive one of the control signals from the write decoding logic and to provide write data to the corresponding register based on the control signal.

18. The system of claim 17, wherein the registers within the register file comprises edge-triggered flip-flops, and wherein each register is operable to receive the write data from the multiplexer and to receive one of the write signals from the write decoding logic.

19. The system of claim 18, wherein for each register other than a first register, the write data provided by each multiplexer to the corresponding register based on the control signal comprises data from a previous register in the register file.

20. The system of claim 13, wherein the register file is operable to receive the shift signal from an external component.

* * * * *